United States Patent [19]

Joyner

[11] Patent Number: 4,640,185
[45] Date of Patent: Feb. 3, 1987

[54] FUNNEL STOCK/SAUCE SEPARATOR

[76] Inventor: Auvin H. Joyner, 2 Walnut St., Pawling, N.Y. 12564

[21] Appl. No.: 800,277

[22] Filed: Nov. 21, 1985

[51] Int. Cl.⁴ .............................................. A47J 43/28
[52] U.S. Cl. .................................... 99/495; 99/444; 141/341; 141/344; 210/249; 210/513
[58] Field of Search ................................ 99/495–497; 210/513–519, 249; 141/331, 340–344

[56] References Cited

U.S. PATENT DOCUMENTS 192,348  6/1877  Preston .............................. 141/341
4,389,926  6/1983  Joyner ................................ 99/495

Primary Examiner—Timothy F. Simone
Attorney, Agent, or Firm—Richard L. Miller

[57] ABSTRACT

A funnel stock/sauce separator for separating fat from liquid is provided and consists of a funnel having a conical vessel for storing therein the liquid which is to be separated from the fat at top of the liquid, a cylindrical housing which supports the funnel onto a support surface and a manually operated closure member positioned within the funnel over a spout for controlling outflow of the liquid through the spout.

6 Claims, 6 Drawing Figures

FUNNEL STOCK/SAUCE SEPARATOR

BACKGROUND OF THE INVENTION

The instant invention relates generally to liquid separators and more specifically it relates to a funnel stock/sauce separator for separating fats from gravy.

Numerous liquid separators have been provided in prior art that are adopted to remove gravy from fats. For example, Applicants U.S. Pat. Nos. 4,331,189; 4,389,926 and 4,464,265 all are illustrative of such prior art. While these units may be suitable for the particular purposes to which they address, they would not be as suitable for purposes of the present invention as heretofore described.

SUMMARY OF THE INVENTION

A principal object of the present invention is to provide a funnel stock/sauce separator that will overcome the shortcomings of the prior art devices.

Another object is to provide a funnel stock/sauce separator that includes a manually operated closure member which when raised causes the non-oil liquid contents to be released to a receiving container below.

An additional object is to provide a funnel stock/sauce separator in which when separation of the liquid and oil has been completed, the closure member is lowered and the separator is conveniently set down without need for further attention to the closure member.

A further object is to provide a funnel stock/sauce separator that is stable and safe to use.

A still further object is to provide a funnel stock/sauce separator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENT

Figure 1:
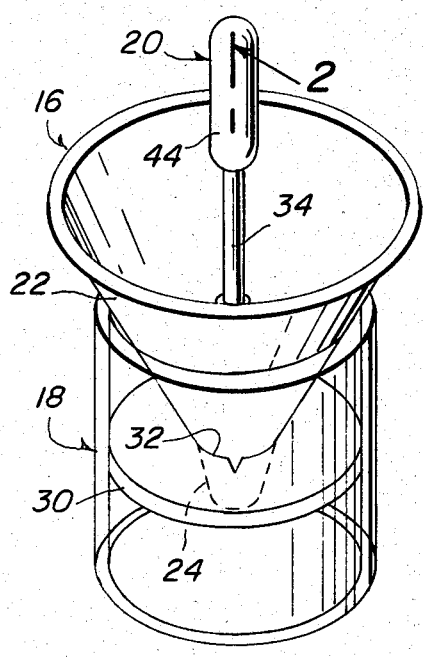
FIG. 1 is a perspective view of the invention.
Figure 2:
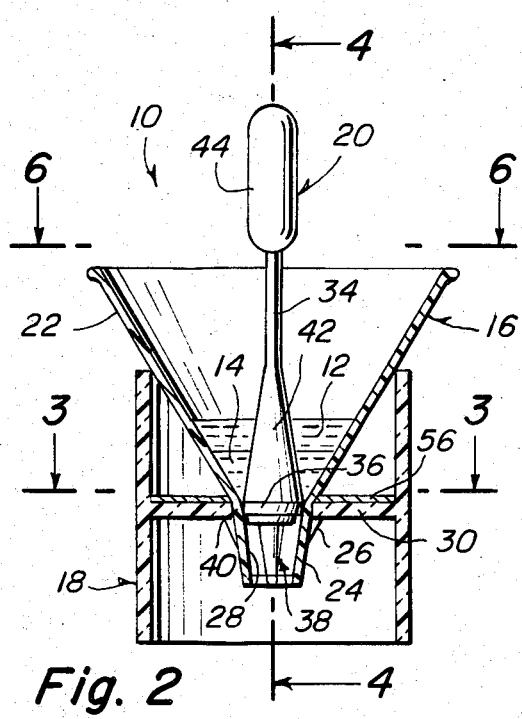
FIG. 2 is a vertical cross sectional view taken along line 2—2 in FIG. 1.
Figure 4:
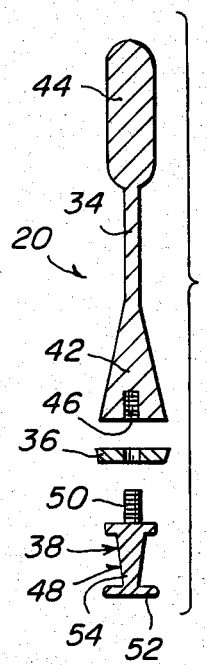
FIG. 4 is an exploded vertical cross sectional view of the closure member taken along line 4—4 in FIG. 2.
Figure 3:
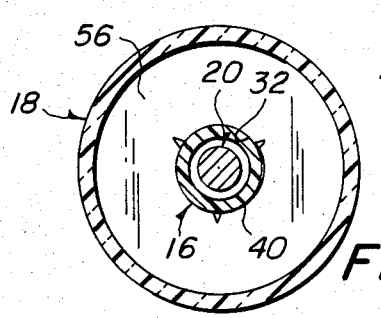
FIG. 3 is a horizontal cross sectional view taken along line 3—3 in FIG. 2.
Figure 5:
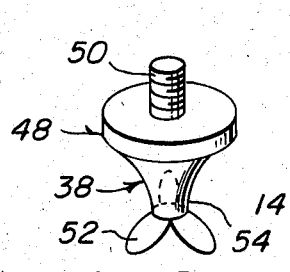
FIG. 5 is a perspective view of the base element of the handle-stopper.

Turning now descriptively to the drawings, in which similar reference characters denote similar elements FIGS. 1 through 6 illustrate a funnel stock/sauce separator 10 for separating fat 12 from a liquid 14 such as beef stock.

The separator 10 consists of a funnel 16, a cylindrical housing 18 and a manually operated closure member 20.

The funnel 16 is for storing therein the liquid 14 which is to be separated from the fat 12 at top of the liquid. The funnel 16 includes a wide mouth conical vessel 22 and a short tapered spout 24 with bayonet projections 26 thereon. The spout 24 extends downwardly from the conical vessel 22 and has an opening 28 formed therein through which the liquid 14 is removed from the conical vessel 22.

The cylindrical housing 18 contains a horizontal midpartition 30 that has a central notched hole 32 to accommodate and secure the projections 26 of the spout 24 when the spout is placed and turned within the notched hole 32. The conical vessel 22 sits on top of the housing 18 so that the housing supports the funnel 16 onto a support surface.

The manually operated closure member 20 is positioned within the funnel 16 for controlling outflow of the liquid 14 through the spout 24. The closure member 20 includes a stem 34, a valve element 36 and a device 38 for attaching the valve element 36 to the stem 34.

The stem 34 is reciprocally movable within the conical vessel 22. The valve element 36 has a diametrical cross-sectional area approximately equal to diametrical cross-sectional area of the opening 28 in the spout 24 at juncture 40 with the conical vessel 22.

When the valve element 36 is positioned on the opening 28 in the spout 24 at the juncture 40 of the conical vessel 22 the liquid 14 within the conical vessel is prevented from flowing through the opening 28 in the spout 24. When the valve element 36 is lifted up from the opening 28 in the spout 24 at the juncture 40 of the conical vessel 22 the liquid 14 is allowed to flow outwardly therethrough.

The opening 28 in the spout 24 is circular in cross-section. The valve element 36 is a valve washer made of soft compressible material for a snug liquid tight fit on the opening 28 in the spout 24 at the juncture 40 of the conical vessel 22.

The stem 34 contains a first end 42 affixed to the valve washer 36 and a second end 44 remote and spread from the first end 42. The second end 44 has a finger grip thereon for gripping the stem 34 to thereby reciprocate it within the funnel 16.

The first end 42 of the stem 34 is an enlarged cone that has a central threaded hole 46 formed therein. The attaching device 30 is a weighted base foot 48 that has a threaded shaft 50 extending upwardly therefrom. The shaft 50 passes through the valve washer 36 and is received in the central threaded hole 46 for affixing valve washer 36 to the enlarged cone 42 of the stem 34.

Figure 6:
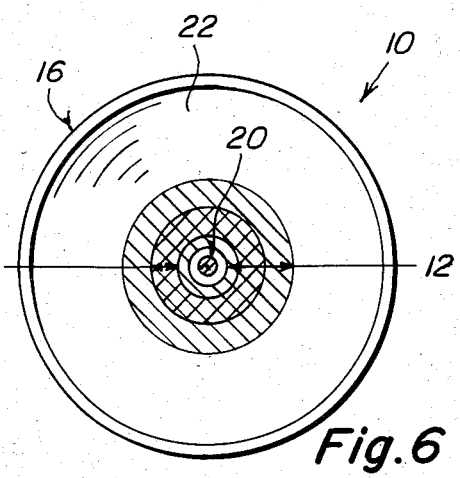
FIG. 6 is a horizontal cross sectional view taken along line 6—6 in FIG. 2 above the funnel showing the fat and stock therein.

The weighted base foot 48 further contains three fins 52 projecting radially outwardly from lower end portion 54 of the weighted base foot for stabilizing the closure member 20 within the funnel 16. When a stock/oil mixture is placed in said funnel 16 said mixture is gravitationally arranged in two interfacing layers with the stock liquid at bottom and the relatively colorless oil at top. This stacking of contrasting layers presents a bull's-eye target pattern of light and dark concentric rings from a top view as illustrated in FIG. 6 and the aforementioned enlarged cone at lower end of stem 34 appears as a round white central dot in said target pattern.

To start the liquid 14 flowing out of the funnel 16 one simply pulls up the closure member 20 to release the valve washer 36. The stock/sauce liquid begins to flow through opening 28 in spout 24 and the two diminishing tinted rings of the target pattern together with the expanding white central dot produce an effective means of accurately monitoring the progress of the separation process which is complete when the darker ring of the underlying stock layer vanishes between the expanding central white dot and the outer ring of overlying oil layer. To stop the flow of the liquid 14 one simply releases the closure member 20 and the valve washer 36 will drop back to seat over the opening 28 of the spout 24.

The funnel 16 can be made out of translucent material while the housing 18 can be made out of transparent material. A white colored disc 56 can be placed over the mid-partition 30 of the housing 18 to reflect light upward through liquid contents of the funnel 16 so that a person using the separator 10 can easily distinguish between the fat 12 and the liquid 14 when looking downwardly into the funnel 16, as typically illustrated in FIG. 6.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A funnel stock/sauce separator for separating fat from liquids comprising:
    (a) a funnel for storing therein said liquid which is to be separated from said fat at top of said liquid, said funnel including:
        (i) a wide mouthed conical vessel, and
        (ii) a short tapered spout with bayonet projections thereon, said spout extending downwardly from said conical vessel having an opening formed therein through which said liquid is removed from said conical vessel;
    (b) a cylindrical housing with a horizontal mid-portion having a central notched hole to accommodate and secure said projections of said spout when said spout is placed and turned within said notched hole with said conical vessel sitting on top of said housing so that said housing supports said funnel onto a support surface; and
    (c) a manually operated closure member positioned within said funnel for controlling outflow of said liquid through said spout, said closure member including:
        (i) a stem reciprocally movable within said conical vessel;
        (ii) a valve element positioned above the spout, said spout limiting the downward movement of the valve element, said valve element having diametrical cross-sectional areas approximately equal to diametrical cross-sectional area of said opening in said spout at juncture of said conical vessel; and
        (iii) means for attaching said valve element to said stem whereby when said stem is moved downwardly said valve element is positioned on said opening in said spout at said juncture of said conical vessel and said liquid within said vessel is prevented from flowing through said opening in said spout and when said stem is moved upwardly said valve element is lifted up from said opening in said spout at said juncture of said conical vessel and said liquid is allowed to flow outwardly therethrough.

2. A funnel stock/sauce separator as recited in claim 1 further comprising:
    (a) a said opening in said spout being circular in cross-section; and
    (b) a said valve element being a valve washer made of soft compressible material for a snug liquid tight fit on said opening in said spout at said juncture of said conical vessel.

3. A funnel stock/sauce separator as recited in claim 2, wherein said stem comprises:
    (a) a first end affixed to said valve washer; and
    (b) a second end remote and spaced from said first end, said second end having a finger grip thereon for gripping said stem to thereby reciprocate it within said funnel.

4. A funnel stock/sauce separator as recited in claim 3 further comprising:
    (a) said first end of said stem being an enlarged cone having a central threaded hole formed therein; and
    (b) said attaching means is a weighted base foot having a threaded shaft extending upwardly therefrom, said shaft passing through said valve washer and being received in said central threaded hole for affixing said valve washer to said enlarged cone of said stem.

5. A funnel stock/sauce separator as recited in claim 4 wherein said weighted base foot further comprises a plurality of fins projecting radially outwardly from a lower end portion of said weighted base foot for stabilizing said closure member within said funnel.

6. A funnel stock/sauce separator as recited in claim 5 wherein said weighted base foot having radial fins secures valve washer within circular opening to maintain a frictionless closure of said opening by gravity only so that valve means may be opened by a smoothly controlled upward movement thereof.

* * * * *